United States Patent
Ledoux

[11] 3,823,320
[45] July 9, 1974

[54] ELECTRO-OPTIC DEVICE FOR COUNTING OBJECTS

[75] Inventor: Johan Ledoux, Wageningen, Netherlands

[73] Assignee: N. V. Ledoux, Dodewaard, Netherlands

[22] Filed: Sept. 7, 1972

[21] Appl. No.: 286,998

[30] Foreign Application Priority Data
June 16, 1972 Netherlands.................. 7208307

[52] U.S. Cl............ 250/222 PC, 250/226, 356/102, 350/205
[51] Int. Cl. ............................................. G01p 3/68
[58] Field of Search.......... 250/221, 222 R, 222 PC, 250/216, 226; 350/205, 189; 356/102

[56] References Cited
UNITED STATES PATENTS

| | | |
|---|---|---|
| 2,875,666 | 3/1959 | Parker et al. ................. 250/222 PC |
| 3,094,625 | 6/1963 | Hendrick, Jr. ................ 250/222 PC |
| 3,335,285 | 8/1967 | Gally, Jr. et al. ............... 350/205 X |
| 3,476,463 | 11/1969 | Kreuzer .............................. 350/189 |
| 3,504,960 | 4/1970 | Harper.............................. 350/205 |
| 3,615,433 | 10/1971 | Biernson et al..................... 350/205 |

*Primary Examiner*—Walter Stolwein
*Attorney, Agent, or Firm*—Marshall & Yeasting

[57] ABSTRACT

A ribbon-shaped beam of light is projected onto an objective lens, and a light transducer has a sensitive surface onto which the ribbon-shaped beam of light is focussed by the lens as a small light spot. The ribbon-shaped beam of light extends transverse to and intersects the path of movement of the objects. Means, arranged across the path of the ribbon-shaped beam maintains a predetermined gradation in light density across the width of the beam.

1 Claim, 2 Drawing Figures

PATENTED JUL 9 1974

3,823,320

ELECTRO-OPTIC DEVICE FOR COUNTING OBJECTS

BACKGROUND OF THE INVENTION

The invention relates to an electro-optic device for counting objects that pass separately through a light beam directed onto a light transducer.

In such counting devices the counting takes place because each passing object intercepts the light beam to a greater or lesser extent and thereby obscures the light transducer to a greater or lesser extent. For preventing two or more objects from intercepting the light beam simultaneously and together, in which case they would be counted as a single object, it is necessary for the objects to pass at intervals. To that end, one usually drops the objects one by one through the light beam. In doing so, the fall trajectory cannot usually be predicted accurately, so that it is necessary to use a comparatively wide light beam for ensuring that any object, whatever its fall trajectory, passes through the light beam and obscures the light transducer. This causes only a small part of the light to be intercepted, so that only a small obscurement of the light transducer is obtained.

SUMMARY OF THE INVENTION

The invention aims at providing a device of this kind, in which notwithstanding the relatively large width of the light beam, a sufficient degree of obscurement of the light transducer by the passing objects is obtained.

The invention is characterized in that a ribbon-shaped light beam, the width of which is transverse to the direction of movement of the objects, by an objective is focussed to a small light dot on the sensitive surface of the light transducer.

By the use of a ribbon-shaped light beam rather than the usual light beam with circular cross-section, each object to be counted upon passage obscures a larger portion of the light beam than would be the case with the usual light beam with circular cross-section. By focussing the ribbon-shaped light beam with an objective to a small light spot, a single light transducer with a small sensitive area can be used, so that it is not necessary to use an array of light transducers which are so situated that their light sensitive surfaces adjoin each other. The ribbon-shaped light beam can be obtained by means of a slit diaphragm. This can be arranged between the light source and the trajectory of the objects to be counted or between the trajectory of the objects to be counted and the light transducer. If the slit diaphragm is arranged between the trajectory of the objects to be counted and the light transducer, the objects to be counted do fall through a beam that is not restricted by the slit diaphragm, but only the part thereof which is selected by the slit diaphragm reaches the light transducer. This arrangement has the advantage that the slit diaphragm intercepts as much stray light as possible. If desired the slit diaphragm can be provided on a surface of the objective lens or on the surface of a condenser for forming the light beam.

In order that the degree of obscurement of the light transducer be as independent as possible from the place at which the object to be counted falls through the ribbon-shaped light beam, all elemental areas of the ribbon-shaped light beam should provide equal contributions to the illumination of the light transducer. If this is not the case, because the light distribution is inhomogeneous, or because the transmission of the objective is inhomogeneous, this can be compensated by having the transmission of the slit diaphragm vary along its length. If e.g. the light beam at the edges is most intense or if the transmission of the objective is highest at its edges, the transmission of the slit diaphragm at the ends can be less than in the centre.

DESCRIPTION OF THE PREFERRED EMBODIMENTS

Figure 1:
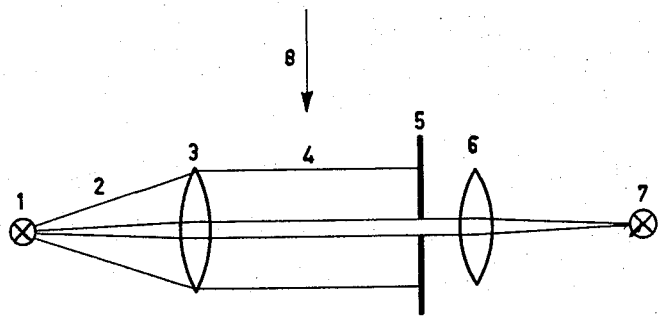
FIG. 1 is a sketch of a device according to the invention.

In FIG. 1 the light source 1, which can e.g. consist of an incandescent lamp, generates a diverging light beam 2. This is converted into a parallel light beam 4 by a condenser 3. The slit diaphragm 5 selects a ribbon-shaped light beam thereof, which by an objective 6 is focussed upon a light transducer 7. The objects to be counted fall along the arrow 8 through the ribbon-shaped light beam which is selected by the slit diaphragm 5.

Figure 2:
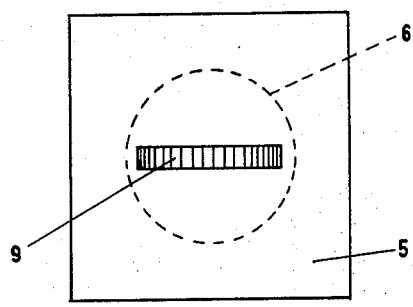
FIG. 2 is a schematic view of a split diaphragm as employed in the device of FIG. 1.

According to FIG. 2, the slit diaphragm can consist of a sheet in which a slit 9 is provided. As shown the length of the slit 9 can be approximately equal to the diameter of the objective 6, but a smaller length of the slit 9 is also possible. The length of the slit 9 and thereby the width of the ribbon-shaped light beam is sufficient for allowing a generous degree of latitude to the trajectory according to which the objects fall through the light beam. The width of the slit 9 and thereby the thickness of the ribbon-shaped light beam is sufficiently small for ensuring that each object while falling through the ribbon-shaped beam intercepts a part of it over the full thickness of the ribbon-shaped light beam, even though that object obscures only a relatively small part of the width of the ribbon-shaped light beam. In this way it is ensured that notwithstanding the relatively large width of the light beam, a sufficient part of the light is intercepted upon passage of the object to be counted.

As shown in FIG. 2, the slit 9 can be provided with a line grid or filter of graded density, whereby the transmission of the slit varies along its length. This variation of the transmission of the slit can serve for compensating variations of the intensity of the incoming light beam along the length of the slit, and/or for compensating the variation of the transmission of the objective 6 from the centre toward the edge. If e.g., the incoming light beam at its edges is more intense than in the centre and/or the transmission of the objective 6 at its edge is larger than in its centre, a smaller transmission of the slit 9 near its ends can be obtained by broadening the non-transmitting lines near the ends and/or by arranging them closer together than in the centre. In this way, the degree of obscuring of the light transducer 7 which is caused by objects falling through the light beam 4 can be made independent of the trajectory of these objects.

Although the slit diaphragm 5 in FIG. 1 is provided between the trajectory 8 of the objects to be counted and the objective 6, it is also possible to arrange the slit diaphragm 5 between the condenser 3 and the trajectory 8 of the objects to be counted. The slit diaphragm 5 is shown in FIGS. 1 and 2 as a sheet in which a slit is provided. However, it is also possible to provide the slit diaphragm on a surface of the condenser 3 or of the objective 6. Providing the slit diaphragm between the trajectory 8 of the objects to be counted and the light transducer 7 offers the advantage that the diaphragm intercepts as much stray light as possible. If desired, slit diaphragm in front of as well as behind the trajectory 8 of the objects to be counted can be used.

I claim:

1. An electro-optic device for counting a succession of moving objects, comprising an objective lens, a light source arranged to transmit a beam of light across the path of travel of the objects and through the objective lens, and a light transducer having a sensitive surface onto which the light beam is focussed by the lens, wherein the improvement comprises a screen arranged between the light source and the objective lens, having a rectangular slit which selects from the light beam a narrow rectangular beam extending transversely across the path of the moving objects and a filter of graded density arranged to intercept the light forming the narrow rectangular beam, the image of the rectangular beam leaving the objective lens being of non-uniform intensity in the absence of the filter but being of substantially uniform intensity with the filter present and means for passing a succession of moving objects between the light source and the filter.

* * * * *